United States Patent [19]

Gordy

[11] 4,397,712

[45] Aug. 9, 1983

[54] SEMI-CHEMICAL PULPING PROCESS

[75] Inventor: John Gordy, Richmond, Canada

[73] Assignee: New Fibers International, Nassau, The Bahamas

[21] Appl. No.: 303,944

[22] Filed: Sep. 21, 1981

Related U.S. Application Data

[63] Continuation-in-part of Ser. No. 237,723, Feb. 24, 1981, abandoned, which is a continuation of Ser. No. 83,784, Oct. 11, 1979, Pat. No. 4,259,147, which is a continuation of Ser. No. 842,262, Oct. 4, 1977, abandoned, which is a continuation of Ser. No. 551,259, Feb. 20, 1975, abandoned.

[51] Int. Cl.$^3$ .............................................. D21C 3/20
[52] U.S. Cl. ........................................ 162/19; 162/40; 162/63; 162/72; 162/77
[58] Field of Search ..................... 162/11, 16, 19, 26, 162/28, 41, 70, 72, 77, 40, 29, 63

[56] References Cited

U.S. PATENT DOCUMENTS

| | | | |
|---|---|---|---|
| 1,574,026 | 2/1926 | Fish, Jr. ............................... | 162/72 |
| 1,594,389 | 8/1926 | Thellier ................................ | 162/72 |
| 2,192,202 | 3/1940 | Peterson et al. ..................... | 162/40 |
| 3,308,011 | 3/1967 | Ross ..................................... | 162/82 |
| 3,619,348 | 11/1971 | Asplund et al. .................... | 162/52 |
| 4,073,678 | 2/1978 | Hammond et al. ................. | 162/40 |

FOREIGN PATENT DOCUMENTS 705044  12/1979  U.S.S.R. ................................ 162/26

*Primary Examiner*—William F. Smith
*Attorney, Agent, or Firm*—LeBlanc, Nolan, Shur & Nies

[57] ABSTRACT

A process for producing corrugating medium pulp, fuel, and other products from a wide variety of woody materials is disclosed. In one embodiment a pulping solution is produced by cooking green chips in a water solution of monoethanolamine and subsequently collecting the liquor produced. Pulp is then produced by digesting chips under a vapor dome of the pulping solution, or cooking the chips in the solution and subsequently digesting under a vapor dome. Digested chips are then refined in pulping solution to produce corrugated medium pulp. In another embodiment, fuel may be produced by digesting woody material under a vapor dome with sulfur dioxide and ammonia. The digested chips then yield a lignin containing liquor which has a good fuel value and may be used as a liquid fuel or impregnate for woody material. In another embodiment the pulping solution is used as a hard wood conversion resin. Wood is impregnated and pressed. The pressed wood may have a density of twice the original wood. Monoethanolamine vapor also can convert soft wood to hard wood. When wood is vapor impregnated under a vapor dome it may be pressed to a more dense configuration. In both hard wood embodiments the pressed wood maintains its pressed configuration so that it may be used in construction or as a fuel.

14 Claims, No Drawings

SEMI-CHEMICAL PULPING PROCESS

This application is a continuation-in-part of U.S. patent application Ser. No. 237,723, filed Feb. 24, 1981 now abandoned which is a continuation of U.S. patent application Ser. No. 083,784, filed Oct. 11, 1979, now U.S. Pat. No. 4,259,147 which was a continuation of U.S. patent application Ser. No. 842,262, filed Oct. 4, 1977, was abandoned, which in turn was a continuation of Ser. No. 551,259, filed Feb. 20, 1975, now abandoned.

This application is also related to U.S. patent application Ser. No. 083,785, filed Oct. 11, 1979, now U.S. Pat. No. 4,259,151, which was a continuation of U.S. patent application Ser. No. 962,971, filed Nov. 22, 1978, now abandoned, which in turn was a continuation-in-part of U.S. patent application Ser. No. 959,620, filed Nov. 13, 1978, now abandoned, which in turn was a continuation of U.S. patent application Ser. No. 821,468, filed Aug. 3, 1977, now abandoned, which in turn was a division of U.S. patent application Ser. No. 551,259, filed Feb. 20. 1975. Accordingly, the disclosures of said parent U.S. patents and patent applications are hereby incorporated by reference in their entirety.

This invention relates to an improved wood pulping process for removing the lignin constituents thereof without contamination so that the lignin constituents are available for use as fuels, ingredients for fuels, or in the formation of related products. The process of this invention may be adapted to produce semi-chemical pulp suitable, for example, in the production of liner board, containers, and the like. The process of this invention may also be adapted to modify the characteristics of the lignin constituents of wood in situ to produce a dense fuel or hard wood material and related products.

In the above identified parent cases, a process and apparatus for producing different grades of wood pulp from a variety of wood species was disclosed. The process produced, in high yields, pulps from dissolving grade to container grade, or an intermediate fibrous material and readily reusable by-products.

Most importantly, the parent process pulped wood without the use of toxic liquors and noxious gases generally associated with commercial pulp processes. The lignin constituent then of the wood pulp was removed without the use of harsh chemicals and this process then produced pulp with novel characteristics as well as uncontaminated by-products which could be then adapted to commercial utilization.

In the parent process wood chips of virtually any species were pulped in two steps. In the initial step, the chips were impregnated with ammonia and sulfur dioxide gas under moderately elevated temperature and pressure conditions under a vapor dome. Subsequently, the liquid and gaseous reactants are withdrawn and the impregnated chips subjected to a digesting step in the presence of sulfur dioxide gas under a vapor dome.

The impregnation and digestion steps cause the lignin constituents of the chips to depolymerize and migrate to the outer surface thereof. Following digesting, the chips are subjected to a lignin dissolving solvent to separate the lignin from the chips. The chips are then defibrated or refined, and washed to produce paper pulp in the desired grade.

The parent process involved the discovery that paper pulp from dissolving grade to container grade could be produced from virtually any type of wood specie depending upon the length of time of the impregnation and digesting steps. Furthermore, the process required only start up water and the reactants could be easily reclaimed for reuse as desired. Furthermore, the process could be modified to produce a resin board if the chips were subjected to heat and pressure instead of refining, or the pulp itself could be pressed to produce a lignin resin board-like material. The lignin concentrate being virtually uncontaminated could, after solvent removal, be utilized to impregnate, for example, low grade lumber. The lignin would provide a means for upgrading the lumber. The lignin could also be used to produce a glue. The process reactants could be either recycled or utilized to produce, with the dissolved wood sugars and similar chemicals, fertilizer.

It will be obvious to those skilled in the art that the aforementioned process provides a means for utilizing undesirable wood materials and producing thereform materials having increased economic value. The process also produces excellent grade paper pulp without harsh or toxic chemicals and therefore the pulping process of the parent invention is not a source of noxious or toxic gaseous or liquid waste, in contrast to commercial Kraft or Sulfite pulping processes.

It was also described in the parent case that wood such as cedar could be subjected to an initial impregnation step and then refined without the subsequent digestion step to produce a defibered woody product. As described therein, cedar disposal at saw mills and the like then could be facilitated by utilizing waste cedar to produce an installation or packing material. The cedar chips so treated could be defibrated without either the digestion step or the use of the lignin dissolving solvent.

It has now been discovered that the parent process may be substantially modified to eliminate certain steps and produce products having excellent economic value from wood including waste woods or hard woods as will be subsequently explained.

The lignin dissolving solvent identified in the parent process is the mild organic base, monoethanolamine. This solvent is a well known commercially available chemical not previously known for its utility in a wood pulping process to facilitate separation of a lignin from wood fibers. While other related organic chemical bases could facilitate lignin separation, it is preferred to utilize monoethanolamine. The lignin solvent described hereinafter in the modified processes of this invention will also be the organic base, monoethanolamine.

While the process described in the above identified patent applications is intended to produce, and will produce pulps of a variety of grades, it has been discovered that a modification thereof can be used to produce corrugating medium pulp, and by-products having good fuel value, or a dense fuel product having good fuel value. In the preferred embodiment of this invention a pulping solution is produced from wood chips which may then be utilized to pulp subsequent batches of wood chips to produce semi-chemical wood pulp.

The chips used to produce the pulping solution are short fibered species such as aspen, oak, alder, cottonwood or other temperate or tropical hardwoods. Green chips are cooked in a digester vessel with an aqueous solution of monoethanolamine under controlled conditions of heat and pressure. Typically, the chips are cooked at 285° F. to 325° F. from 5 to 15 minutes under controlled pressure of for example about 50 pounds per square inch. At the conclusion of the cook the digestor is vented to a heat exchanger to recover the heat value of the gases, and the liquid is routed to a blow tank. The chips are washed with an equal volume of water and the wash water combined with the liquid. The liquid, which may be further diluted, is then available for use as a pulping solution in the New Fibers Semi-Chemical process. The extracted chips are not suitable for a corrugating medium pulp, but may by used in the production fuel. Other uses include the production of a defibered woody material for use as a packaging material. The defibered woody material may also be combined with adhesives and pressed to produce a fiber-type board material.

The preferred embodiment of the pulping process of this invention utilizes a predetermined quantity of the cooking solution with green chips. The chips and solution are combined in a digestor which is then heated up to a temperature of about 212° F. and vented to remove entrained air. The vessel is then sealed and the chips are maintained under a pressure of about 50 psig and at a temperature of around 285° F. for a period of 5 to 10 minutes. This initial impregnation step is then followed by a digestion step.

Preferably in the process of this invention the vessel described and claimed in the above-identified patent applications is utilized. Following impregnation the liquid level within the digestor is permitted to drop below the chips. The chips are then exposed in vapor phase, under a vapor dome to the pulping solution for a period of about 15 minutes. The digestor vessel is then vented to a heat exchanger for recovery of the heat value in the gases. The recovered condensate is routed back to cooking chemical storage tanks. The chips and pulping solutions are then blown into a blow tank.

The chips are refined in the liquor, which serves as a lubricant, to form pulp. The pulp is then screened, washed, beaten, and conveyed to a paper machine to produce sheets in the conventional fashion.

The process of this invention is adaptable also to conventional screw type continuous digestors such as the Pandia Chemi Pulper and the Asplund Defibrator which use an impregnation vessel and a vapor phase cooking.

If it is desired to manufacture the pulping solution for use at a remote location, a fresh batch of chips is used for each cook according to the above described process.

It has been found that cooking solutions prepared from fresh green chips yield cooking solutions which lead to the desired quality specifications for Corrugating Medium Pulp. Also, under this procedure, residual extracted chips provide a raw material feed for fuel or fiber-board materials.

In another embodiment of this invention the afore described process may be modified to produce a hard wood conversion resin liquid. This resinous material may be used to impregnate wood which is then pressed. Under conditions of heat and pressure the wood will densify to a thickness of about ½ and within a few hours form an extremely dense, hard wood which will not return to its original configuration.

In the alternative, instead of using chips, boards, logs, and the like may be subjected to a vapor phase cook in a digester vessel similar to the vessel described in the above-identified patent applications. The vapor medium consists of a dilute solution of monoethanolamine. After the wood has been subjected to or cooks in vapor phase, under a vapor dome at similar conditions of heat and pressure, the wood may be removed from the digestor and immediately pressed. Under pressure the wood will densify to at least about twice the previous density. Within a few hours, when the pressure is released, the wood will retain the compressed configuration. In this way, waste wood may be reconstituted as hard wood for use in furniture making or the like, or for use as a fuel.

As noted, in the above-identified patent applications a two-step process was described for producing paper pulp. One important by-product of the process was the production of a fertilizer. As is well known to those skilled in the art, sugars and other materials are present in wood. The process extracted a liquid from the wood chips which included sugars. The fertilizer production then utilized liquid by-products of both an impregnation and subsequent digestion step. The liquid was acidified and subjected to chelation in an electrolytic cell to form metal chelates with the organic constituents extracted from the wood together with sulfates and nitrates. It has now been discovered that this process may be altered to produce fuel. Also, the extracted wood sugars may be fermentated to produce wood alcohol which is suitable for mixing with gasoline.

Specifically, wood chips are initially subjected to the identical impregnation step utilizing $SO_2$ gas and ammonia or preferably ammonia hydroxide liquid as described in the parent patent applications. The chips are impregnated under a vapor dome at temperature and pressure conditions of about 250° F. and 150 psig. The subsequent digestion step described however is eliminated, and the contents of the vessel are then treated with a lignin dissolving solvent such as monoethanolamine. The solvent extracts the lignin material which has been found to have good fuel value as a liquid.

In the alternative, the liquid contents of the vessel may be routed to an alcohol plant wherein the liquid is neutralized to form ammonia sulfite and bisulfite admixed with sugars and minerals inherent in the wood. The neutralized material is then acidified and steamed distilled to remove the $SO_2$. The $SO_2$ may then be returned to storage. Yeasts are then added to the liquid in a conventional fashion to ferment the wood sugars present. The material is then permitted to ferment under controlled temperature conditions and subsequently distilled to remove the alcohol formed.

The treated chips may be used as a fuel, or may be subjected to destructive distillation to produce a fuel gas and charcoal. It has been discovered that if the impregnated chips and liquid are subjected to the lignin dissolving solvent to extract the lignins therefrom upon separation the liquid may be used as a fuel. The liquid may be subjected to evaporation to remove excess water therefrom, and in this instance, the sulfur from sulfur dioxide gas used in the impregnation step remains primarily with the solid chips.

Accordingly, it is an object of this invention to provide a process for producing semi-chemical pulp suitable for container construction from a wide variety of different woods which will provide as a by-product, a lignin containing liquid also having economic value.

It is another object of this invention to provide a process for producing a pulping solution for manufacturing container grade semi-chemical pulp from a wide variety of different woods with a liquid by-product which may be used as a hard wood conversion resin, or a fuel.

It is another object of this invention to provide a modified pulping process for producing a liquid or densified solid fuel from any wood species whereby the available fuel value from the wood specie is maximized.

It is yet another object of this invention to provide a process for producing alcohol from wood which will also produce as a by-product a solid densified fuel.

It is yet another object of this invention to produce a semi-chemical pulp, and as a by-product a resinous material which may be utilized to convert soft wood to hard wood.

These and other objects will become readily apparent with reference to the following description:

PREPARATION OF PULPING SOLUTION

As an initial step in the preferred embodiment of the semi-chemical pulping process of this invention a pulping solution is prepared. The pulping solution is prepared from a dilute solution of a lignin dissolving solvent and green (short fiber) chips. Temporate or tropical hardwoods are preferred because of the chemical nature of the resin extractives. Cooking solutions prepared from these species produce a superior quality of Corrugating Medium Pulp. In the preferred embodiment of this invention, as noted above, the lignin dissolving solvent is monoethanolamine. Initially from about 35 to 45 gallons of a monoethanolamine solution having a concentration of about 8 pounds per gallon is diluted with about 1,000 gallons of water. 2,000 Pounds of green chips are then combined with 600 gallons of dilute solution is preferably the digestor vessel described in the above-identified parent applications. The mixture is heated to about 285° F. for about 5 to 10 minutes under a pressure of about 50 lbs. per square inch.

The digestor is then vented to a heat exchanger to recover the heat value of the digestor gases and the liquid from the digestor is routed to a blow tank containing 600 gallons of dilution water. The chips are then washed in the 600 gallons of fresh water, and the wash water is mixed with the contents of the blow tank to yield a total of 1800 gallons of pulping solution. The pulping solution is then pumped to the Pulping Solution Storage Tanks. The chips remaining are not suitable for pulp, but may be used for a fuel as will be subsequently described.

PREPARATION OF CORRUGATING MEDIUM PULP

The process of this invention comprises alternate methods for Corrugating Medium Pulp preparation. The methods are Vapor Phase and Impregnation-Vapor Phase digestion. The Vapor Phase Method produces a higher yield of pulp, and a greater quantity of pulp in a given time. The Impregnation-Vapor Phase Method produces pulp having higher values for tensile strength and Concora, and therefore of higher quality. This pulp also requires less energy to refine.

The Vapor Phase Method is suited to situations where chemical or recycle pulps are available at resonable cost and may be blended with the Vapor Phase pulp to provide sufficient tensile strength for machine production. The Impregnation-Vapor Phase Method conversely is used where such additives are not available at resonable cost.

A. Production of Vapor Phase Corrugating Medium Pulp.

In the preferred embodiment of the alternative processes of this invention digestor vessels such as described in U.S. Pat. No. 4,259,151 are utilized. The vessel design permits either a submerged liquid cook or a vapor phase cook for the chip batch.

Initially 2000–3000 pounds of green chips, 50% aspen and 50% oak, were loaded into a first digestor, and the digestor sealed. Six hundred gallons of pulping solution as described above are pumped into a second digestor. The digestors may be steam jacketed, or heated in another conventional fashion.

Initially the second digestor is heated to approximately 212° F. The steam generated therein is routed to the first digestor and inletted through a bottom connection so that it will sweep upwardly through the chip mass, removing entrained air and heating and conditioning the chips. Digestor Number 1 is also heated.

As soon as steam vents from the first digestor, the steam inlet from the second digestor is closed and the second digestor heated to a pressure of about 100 psi. Any steam condensate in the first digestor is blown to a blow tank. When Digestor Number 2 reaches 100 psi, the vaporized cooking solution therein is introduced, through a top connection, into digestor number 1 to produce a vapor dome around, over and under the chip mass.

The chips in digestor number 1 are then subjected to the vapor under a pressure of 60 to 100 psi for 15 minutes.

At the end of the vapor phase cook, both the digestors are vented to a heat exchanger to recover steam and vapor contents thereof for recycling. Any remaining condensate is blown to a blow tank and subsequently to a storage tank for reuse. The recovered heat is used to preheat the next batch of cooking solution.

Digestor number 1 is vented to zero pressure, but digestor number 2 is only vented to 10–25 psi. The vapor producing cooking solution indigestor number 2 is then blown into digestor number 1 to aid in removing the chips from the digestor. The chips are then refined in the cooking solution which provides heat and lubrication during refining.

During blow down of digestor number 1, digestor number 2 is filled with green chips. As soon as digestor number 1 is blown, the digestor is filled with cooking solution and the cycle repeated.

The use of two digestors results in efficient batch-continuous operation utilizing residual heat in the digesters. As will be obvious to those skilled in the art, however, a single digestor could be adapted for use in the process of this invention.

B. Production of Impregnation-Vapor Phase Corrugating Medium Pulp.

In this method two digestors are also preferred and the preferred vessel is that described in U.S. Pat. No. 4,259,151.

Initially 2000–3000 pounds of green chips, for example 50% oak - 50% aspen, are loaded into digestor number 1 with 600 gallons of the pulping solution of this invention. The digestor is then heated to about 212° F. with steam and overflow vents open to remove entrained air.

While digestor number 1 is heating, digestor number 2 is evacuated. Digestor number 2 is also cooled as for example by circulating cooling water through the heating jacket or coils. This procedure allows the venting of digestor number 2 into digestor number 1 in about one quarter the time required to vent to the heat exchangers.

After digestor number 1 reaches 212° F., the vents are closed and the digestor heated up to 60–100 psi for a period of about 5 minutes to impregnate the chips.

Digestor number 1 is then vented into digestor number 2. Venting time is decreased by the evacuation and cooling of digestor number 2 to between 10-15 minutes as compared to heat exchanger venting which takes 35-45 minutes.

When the pressure in digestor number 1 reaches about 10-25 psi the cooking solution is blown to digestor number 2. The first digestor is then sealed and heated until the pressure reaches 60-100 psi and the chips are subjected to vapor phase cooking in vapor from the residual solution in the chips for 10-15 minutes.

Following the cooking step under the vapor dome within digestor number 1, the digestor is vented into digestor number 2 until the pressure therein is 10-15 psi. The cooking solution in digestor number 2 is then blown into digestor number 1 to aid in removal and blowdown of the chips.

Conventional processes for producing Corrugating Medium Pulp for liner board utilize for example a sodium carbonate pulping solution. While the yield may be high, the pulp sheet has, depending upon the wood furnished, short fibers and low tensile strength. The result is low sheet strength properties. A pulp sheet utilized for the corrugation layer in cardboard, liner board, has different specifications as to strength qualities characteristics in comparison to a normal pulp sheet. The most important quality test for this type of pulp sheet is a stiffness factor termed the Concora number. The pulp produced conventionally using a sodium carbonate cooking solution and an aspen-white oak furnish results in low sheet strength properties. Conventional pulp then requires the addition of higher grades of pulp fibers in the range of 15-25% in order to meet specifications. The standard Concora number measuring the crushing strength of corrugated media is 55. Table I (below) describes the results of tests conducted to produce liner board corrugated media according to the semi-chemical pulping process of this invention as described above:

TABLE I
NEW FIBERS CORRUGATING MEDIUM PULP PROCESS
(Vapor Phase Method)
TYPICAL TENSILE & CONCORA VALUES AT 250 C.S. FRANEOUS

| WOOD FURNISH | TENSILE (lbs. per inch) | CONCORA (lbs. per inch) |
|---|---|---|
| 50% Oak - 50% Aspen | 33.5 | 54.5 |
| 50% Oak - 50% Aspen | 22.6 | 70 |
| 50% Oak - 50% Aspen | 22.4 | 62 |

The pulping solution prepared according to the process of this invention may be reused in subsequent digestion processes as described above for 5-6 runs. After about 5 runs, the cooking solution is spent. Disposal however does not present a problem in that it still has good fuel value. The solution may be concentrated by evaporation to produce a wood oil or it may be merely used in the steam boiler with conventional fuels, or wood fuel produced according to this invention as will be subsequently described.

While the above description of the production of liner board corrugated media utilized the digestion vessel described and claimed in the above applications, the process may also be adapted to conventional batch or continuous equipment such as screw type continuous digestors. In the following example, chips previously cooked in vapor phase were placed in a pressurized cooking vessel of cooking liquor and heated for 5 minutes at 260° F. The chips were then passed through a preheated 12" Sprout-Waldron laboratory refiner. The refine chips were screened, dewatered, and pin shredded. The percent oven dry content was determined and a TAPPI standard PFI evaluation done.

In Tables II and III below, liner board hand sheets were prepared at 33 pounds per M.S.F. (161.1 gsm) and analyzed for tensile strength and concora. Table III shows the average wet strength 33 pound medium and regular 33 pound medium liner board values for tensile and concora. The wood furnish was a 50% oak - 50% aspen.

TABLE II
PHYSICAL DATA SUMMARY FOR SIMULATED LINER BOARD STOCK

| SAMPLE IDENTIFICATION | | R12 | R16 | R17 |
|---|---|---|---|---|
| Refiner Clearance | inches | 0.030 | 0.030 | 0.030 |
| Refined Chip Screening: | | | | |
| Accepts −0.014" | % | 81.9 | 83.6 | 78.9 |
| Rejects +0.014" | % | 18.1 | 16.4 | 21.1 |
| Initial C.S. Freeness: | | | | |
| | mls | 561 | 658 | 669 |
| Tensile | ln/in | 16.9 | 11.3 | 8.0 |
| | Newtons | 75.1 | 50.3 | 35.6 |
| | lbs | 17.8 | 15.9 | 9.9 |
| | Newtons | 79.2 | 70.7 | 44 |
| 400 C.S. Freeness: | | | | |
| PFI Revs | revs | 1000 | 2100 | 3000 |
| Tensile | lb. in | 27.5 | 21.3 | 17.4 |
| | N | 122 | 94.8 | 77.4 |
| Concora | lbs | 32.0 | 42.0 | 40.0 |
| | N | 142 | 187 | 178 |
| 300 C.S. Freeness: | | | | |
| PFI Revs | revs | 200 | 3000 | 4200 |
| Tensile | lb/in | 32.0 | 22.3 | 20.8 |
| | N | 142 | 99.2 | 92.5 |
| Concora | lb | 44.5 | 60.5 | 54.5 |
| | N | 198 | 269 | 242 |
| 250 C.S. Freeness: | | | | |
| PFI Revs | revs | 2650 | 3400 | 4800 |
| Tensile | lb/in | 33.5 | 22.6 | 22.4 |
| | N | 149 | 101 | 99.6 |
| Concora | lbs | 54.5 | 70.0 | 62.0 |
| | N | 242 | 311 | 276 |
| 200 C.S. Freeness: | | | | |
| PFI Revs | revs | 3300 | 3800 | 5400 |
| Tensile | lb/in | 34.5 | 23.0 | 24.0 |
| | N | 153 | 102 | 107 |
| Concora | lbs | 68.0 | 80.0 | 70.0 |
| | N | 302 | 356 | 311 |

TABLE III
33 lb/M.s.f. LINER BOARD TYPICAL TENSILE AND CONCORA VALUES

| Mill | Basis Weight gsm | Tensile lbs/in | Tensile Newtons | Concora lbs. | Concora Newtons |
|---|---|---|---|---|---|
| Wet Strength Medium | | | | | |
| 1 | 159 | 31.2 | 139 | 88.8 | 395 |
| 2 | 165 | 32.9 | 146 | 66.8 | 297 |
| 3 | 163 | 38.2 | 170 | 76.7 | 341 |
| 4 | 159 | 31.6 | 141 | 80.3 | 357 |
| 5 | 160 | 43.5 | 193 | 85.2 | 379 |
| 6 | 164 | 33.6 | 149 | 74.2 | 330 |
| 7 | 164 | 36.2 | 161 | 80.0 | 356 |
| 8 | 160 | 31.3 | 139 | 78.9 | 351 |
| 9 | 161 | 36.6 | 163 | 81.6 | 363 |
| Average: | 161.7 | 35.0 | 156 | 79.2 | 352 |
| Regular Medium | | | | | |
| 1 | 153 | 30.3 | 135 | 66.5 | 296 |

TABLE III-continued 33 lb/M.s.f. LINER BOARD
TYPICAL TENSILE AND CONCORA VALUES

| Mill | Basis Weight gsm | Tensile lbs/in | Tensile Newtons | Concora lbs. | Concora Newtons |
|---|---|---|---|---|---|
| 2 | 162 | 33.5 | 149 | 58.2 | 259 |
| 3 | 164 | 31.5 | 140 | 69.5 | 309 |
| 4 | 164 | 38.7 | 172 | 81.6 | 363 |
| Average: | 160.8 | 33.5 | 149 | 69.0 | 307 |

In summary then, this embodiment of the process of this invention utilizes a pulping solution consisting of a dilute mixture of the lignin dissolving solvent and extracted lignin and other constituents from wood. By subjecting wood chips to an initial impregnation step followed by a digestion step under a vapor dome a softening of the chips occurs with associated depolymerization of the lignin constituents thereof.

Following the digestion step then, the lignin constituents have been sufficiently depolymerized so that the digested chips may be refined and defibered in conventional refining equipment. The refining step is facilitated by utilization of the pulping solution as a lubricant therefore.

The process of this embodiment then produces corrugating medium pulp without harsh treatment associated with conventional processes. The yield is substantially increased, and most importantly, the individual fibers are not degraded by the pulping action in the extent they are degraded under conventional processes. Therefore, when the pulp is used to produce corregation media, a superior product will result without the necessity to add high grade pulp to the pulp produced. The resulting product may be produced from a wide variety of woody materials, and a relatively inexpensive product will result due to elimination of the need to supplement the pulp produced with high grade pulp. The corrugating medium pulp produced according to the process of this invention, then, will meet the standards of stiffness necessary for producing acceptable corregation media without pulp additives.

As noted above, the pulping solution may be reused about five times before it is spent. Once the pulping solution is spent, it may be concentrated by evaporation to form a liquid similar in composition to fuel oil. The concentrated solution, could be cracked to produce by-products or mixed with a conventional industrial fuel or with wood and burned in, for example, a boiler to capture the heat value. In the alternative the liquid extract from each batch of chips pulped could be used in the production of hard wood or fuel.

PRODUCTION OF HARD WOOD

In another embodiment of this invention it was discovered that logs, lumber, and the like when impregnated with the pulping extract and subsequently subjected to heat and pressure in for example a conventional steam or hydraulic press could produce a vary dense hard wood material. Specifically, if the wood is impregnated with the extract and subjected to heat and pressure it will contract to, for example, about one half the original diameter. When dry, the pressed configuration will be retained so that an ordinary soft wood may be densified to form a hard wood useful for, for example furniture construction, and a wide variety of other commercial uses.

The steam press preferred is only one type of press which could be utilized according to this invention. The impregnated wood also may be compressed to a desired thickness not necessarily one half of the original thickness. The wood may be subjected to, for example 100 to 300 pounds per square inch pressure. As will be obvious to those skilled in the art sufficient pressure is used to achieve the desired thickness. The pressure is normally maintained for 8 to 12 hours, or until the wood has substantially dried.

As will be obvious to those skilled in the art, the amount of pressure utilized will depend upon the quantity of wood and the desired thickness, and therefore will vary. In addition, heat will be generated by the compression of the wood and therefore an external source of heat is not necessary. Furthermore, the time for maintaining the wood under pressure will also vary depending upon the type of wood pressed.

It has also been discovered that in an alternative embodiment of this invention, wood to be pressed need not be impregnated with pulping extract. If lumber, chunk wood and the like is admitted to a digestion vessel with the lignin solvent and subjected to similar conditions of heat and pressure utilized in production of the pulping solution, the wood would become impregnated under the vapor dome produced with the lignin dissolving solvent. Such wood may then be removed from the digestor vessel and pressed in the same manner as described above relative to pulping solution impregnated wood. In this way, superior hard wood may be produced from soft wood very rapidly by impregnating the wood under for example, conditions of 50 pounds per square inch and 285° F. in the vapor of the lignin dissolving solution, monoethanolamine. Specifically, the wood and solution are admitted to the digestor and the digestor heated and vented as described above to remove entrained air. The level of liquid in the digestor is then dropped to below the wood and the temperature and pressure conditions noted above produced within the digestor vessel. The wood is then surrounded on all sides and impregnated by monoethanolamine vapor for about 15 minutes. This impregnation step softens the wood and initiates the lignin depolymerization reaction so that it may then be taken directly to a press and pressed to the desired thickness. This process then produces hard wood having the desired density which may be used for a substitute for conventional hard woods in a variety of uses such as furniture making, construction, and the like. Furthermore, logs, slabwood, bark and the like may be impregnated as described initially above, or, impregnated in vapor as also described above and pressed to produce a dense fuel. In this way low density waste wood such as hog fuel may be densified to produce an economical fuel having a heat value similar to bitumenous coal. The amount of pressure utilized will depend upon the type of wood and the density desired. However, successful tests have been conducted with logs, hog fuel, bark and other scrap wood.

MODIFIED FUEL PRODUCTION PROCESS

As briefly described above, the parent applications describe a process for producing paper pulp from a wide variety of different types of wood species. The parent process consists of initially subjecting chips to an impregnation step with ammonia and sulfur dioxide gas followed by a digestion step with sulfur dioxide gas. Both steps are carried out under a vapor dome so that the chips are subjected to the gases in oil sides, above, and beneath the chip mass. Lignin is then extracted from the chips along with wood sugars and the like with a lignin dissolving solvent, and the chips beaten or refined to produce pulp. It has now been discovered, however, that a high grade fuel may be produced by eliminating the digestion step of the pulping process.

According to the modified process of this invention, chips are initially subjected to an impregnation step with ammonia or ammonium hydroxide and sulfur dioxide gas under a vapor dome in a reactor vessel. After the vessel is sealed the internal pressure is raised to at least about 100 psig to produce an internal temperature of about 250° F. for from 30 minutes to 1 hour. As will be obvious to those skilled in the art, the impregnation time will vary depending upon the wood utilized.

After impregnation, the gases from the vessel are vented as described in the aforementioned parent applications, and the chips admixed with a dilute solution of monoethanolamine such as 500 ml in 10 L of water for each 5 pounds of chips charged to the vessel. After the solvent is added to the vessel the mixture is held therein for one half to one hour under about 50 pounds of pressure at a temperature of up to about 250° F. As will be obvious to those skilled in the art, the solvent may be added for example in a conduit or in the defibrator as desired.

The solvent will rapidly extract depolymerized lignin from the chip mass. The chips may then be refined or, the liquid merely separated therefrom using a conventional procedure in, for example, a centrifuge or a screw press. The lignin containing solution produced than has a very high fuel value. It may be concentrated by evaporation or used to impregnate green chips. Impregnated green chips may be pressed to produce a fuel. It is preferred that the impregnate be about 10 gallons per ton of green chips.

For example, in utilizing a redwood bark sample impregnated as described above and pressed to form a high density fuel, the heat value was found to be 8731 Btu's per oven dry pound. Similarly, a hog fuel sample impregnated as described above yielded a Btu value of 9097 BTU's per oven dry pound.

Table IV below shows the results of similar tests on two solid wood samples similarly impregnated, and three liquid samples. Liquid sample No. 1 contained 45% monoethanolamine, and samples 2 and 3 contained, respectively, 55% and 65% of the lignin dissolving solvent.

TABLE IV

| SAMPLE | ANALYSES | | Calorific Value | |
|---|---|---|---|---|
| | % Oven Dry Content | Specific Gravity | BTU/ lb. | Cal./ Gram |
| Wood Sample No. I-1 | 79.1 | 0.897 | 7111 | 3951 |
| Wood Sample No. I-2 | 89.5 | 0.357 | 7528 | 4182 |
| Liquid Sample No. I-1 | — | — | 7055 | 3919 |
| Liquid Sample No. I-2 | — | — | 9106 | 5059 |
| Liquid Sample No. I-3 | — | — | 10340 | 5744 |

The processed chips may also be subjected to gasification in the absence of air to produce charcoal and a low BTU fuel gas.

Finally, if desired, the liquid extracted from the impregnation step may be used to produce an alcohol fuel. Initially, the liquid would be neutralized with ammonia or ammonium hydroxide to form a sulfite salt with the $SO_2$ present. The neutralized liquid then contains sulfites, sugars, minerals, and the like. The liquid is then acidified with a 3:1 mixture of sulfuric acid and phosphoric acid to strip $SO_2$ and subject by steam distillation for removal of $SO_2$. The $SO_2$ containing vapor is then removed for recovery of $SO_2$. After removal of the $SO_2$, the liquid is neutralized with an excess ammonium hydroxide to form ammonium sulfate and the excess ammonia removed by steam distillation. Conventional yeasts are then added to the mixture which contains the wood sugars with ammonium sulfate and ammonium phosphate. Tanks could be maintained at a temperature of for example 70° F. for fermentation over a 48–50 hour period. Subsequently, the alcohol water solution would be pumped to storage tanks for settling and then to a conventional stripper rectifier for distillation to separate alcohol from the yeast-water solution.

Accordingly, the modified process of the parent invention may be utilized to produce liquid fuel, a solid fuel, or a gaseous fuel. In the alternative, instead of producing fertilizer as described in the parent cases, the wood sugars may be fermented to produce an alcohol which also has fuel value. It will be obvious to those skilled in the art that the quantity of the lignin dissolving solvent which remains in the extracted lignin solution will depend upon the economics of the process and the fuel value of the liquid product desired.

In summary, the process of this invention and its alternatives and modifications involve the production of semi-chemical pulp or fuel from a wide variety of woody materials without the use of harsh liquors. The process of this invention is suited to maximize the economic value of the woody material utilized.

For example, if it is desired to produce semi-chemical pulp, by-products of the process may be used to produce fuel for use in the plant. In the alternative, a pulping solution may be produced for production of the semi-chemical pulp, or a hard wood conversion resin may be produced. The resin has the ability to soften woody materials whereby they may be pressed to be densified. Typically, the pressed wood has a density of about twice that of the woody material. The pressed wood retains its shape, and therefore may be used as a fuel, or as a high grade hard wood lumber for construction or furniture making.

In has also been discovered that the lignin dissolving solvent, itself, may also be used to produce hard wood from soft wood or waste wood species merely by impregnating the wood under a vapor dome with the solvent.

In addition, it has been discovered that the pulping process of the parent inventions may be adapted by elimination of the second step or the digestion step to produce a fuel. The liqnin containing solution extracted with the lignin containing solvent has an excellent fuel value, and may be used to impregnate green woody material to thereby produce a solid fuel, if desired. The processes of the instant invention then are subject to those quantifications which will be obvious to those skilled in the art within the scope of this disclosure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A process for producing corrugated medium pulp comprising: providing a pulping solution containing a lignin extract from green chips in an aqueous solution of a lignin dissolving mild organic base; providing a heated vessel; admitting a predetermined quantity of chips and solution to said vessel; impregnating said chips with said solution; subsequently lowering the level of solution in said vessel below the chips and circulating solution vapor above, below and on all sides of said chips to digest said chips under a vapor dome, under conditions of temperature and pressure effective to initiate a lignin depolymerization reaction in said chips for a predetermined period of time; refining said chips to produce said pulp; and separating the used solution from the pulp.

2. The process of claim 1, wherein after said chips and solution are admitted to said vessel, said vessel is heated, vented and sealed to remove entrained air therefrom.

3. The process of claim 2, wherein the step of impregnating further comprises heating the chips and lignin solution in said vessel to a pressure of about 60-100 psi for about 5 minutes.

4. The process of claim 1, wherein said chips are maintained under said vapor dome at a pressure of about 60-100 psi for at least about 10-15 minutes to initiate the lignin depolymerization reaction.

5. The process of claim 1, wherein the step of refining further comprises refining said chips in said solution;
subsequently, separating said solution from said pulp produced; and collecting said solution for reuse.

6. The process of claim 1, wherein the organic base is monoethanolamine.

7. The process of claim 1, wherein said chips are at least one member selected from the group consisting of alder, cottonwood, aspen or oak.

8. The process of claim 1, wherein said chips are 50% aspen and 50% oak.

9. A process for producing corrugating medium pulp comprising: providing a pulping solution containing a lignin extract from green chips in an aqueous solution of a lignin dissolving mild organic base; providing a heating vessel; admitting a predetermined quantity of chips and solution to said vessel; heating said solution; subsequently digesting said chips by lowering the level of solution in said vessel below the chips and circulating solution vapor above, below and on all sides of said chips to digest said chips under a vapor dome under conditions of temperature and pressure effective to initiate a lignin depolymerization reaction in said chips for predetermined period of time; refining said chips to produce said pulp; and separating the used solution from the pulp.

10. The process of claim 9, wherein after said chips are admitted to said vessel, said vessel is heated, vented and sealed to remove entrained air therefrom.

11. The process of claim 10, wherein the step of digesting further comprises heating the chips and vapors in said vessel to a pressure of about 60-100 psi for about 15 minutes.

12. The process of claim 9, wherein said chips are maintained under said vapor dome at a pressure of about 60-100 psi for at least about 10-15 minutes to initiate the lignin depolymerization reaction.

13. The process of claim 9, wherein the step of refining further comprises refining said chips in said solution;
subsequently, separating said solution from said pulp produced; and collecting said solution for reuse.

14. The process of claim 9, wherein the organic base is monoethanolamine.

* * * * *

UNITED STATES PATENT AND TRADEMARK OFFICE
CERTIFICATE OF CORRECTION

PATENT NO. : 4,397,712

DATED : Aug. 9, 1983

INVENTOR(S) : John Gordy

It is certified that error appears in the above—identified patent and that said Letters Patent is hereby corrected as shown below:

Column 8, line 37 (Table II)

"200" should be --2000--.

Signed and Sealed this

Fifteenth Day of November 1983

[SEAL]

Attest:

GERALD J. MOSSINGHOFF

Attesting Officer    Commissioner of Patents and Trademarks